US008346533B2

(12) United States Patent
Chen et al.

(10) Patent No.: US 8,346,533 B2
(45) Date of Patent: Jan. 1, 2013

(54) COMPILING WORD USAGE FREQUENCIES

(75) Inventors: Yen-Fu Chen, Austin, TX (US); John W. Dunsmoir, Round Rock, TX (US)

(73) Assignee: International Business Machines Corporation, Armonk, NY (US)

(*) Notice: Subject to any disclaimer, the term of this patent is extended or adjusted under 35 U.S.C. 154(b) by 281 days.

(21) Appl. No.: 12/270,149

(22) Filed: Nov. 13, 2008

(65) Prior Publication Data

US 2009/0063483 A1    Mar. 5, 2009

Related U.S. Application Data

(63) Continuation of application No. 11/035,167, filed on Jan. 13, 2005, now Pat. No. 7,490,033.

(51) Int. Cl.
G06F 17/20 (2006.01)
G06F 17/21 (2006.01)

(52) U.S. Cl. .................................. 704/1; 704/8; 704/10
(58) Field of Classification Search .................... None
See application file for complete search history.

(56) References Cited

U.S. PATENT DOCUMENTS

| | | | |
|---|---|---|---|
| 4,897,638 A | 1/1990 | Kokunishi et al. | |
| 5,329,625 A | 7/1994 | Kannan et al. | |
| 5,548,507 A | 8/1996 | Martino et al. | |
| 5,781,879 A * | 7/1998 | Arnold et al. | 704/9 |
| 5,791,879 A | 8/1998 | Fitzgerald et al. | |
| 5,850,480 A | 12/1998 | Scanlon | |
| 5,911,005 A | 6/1999 | Uchiyama | |
| 5,923,778 A | 7/1999 | Chen et al. | |
| 6,009,382 A | 12/1999 | Martino et al. | |
| 6,023,529 A | 2/2000 | Ilan et al. | |
| 6,035,063 A | 3/2000 | Nakashima et al. | |
| 6,128,646 A * | 10/2000 | Miloslavsky | 709/206 |
| 6,144,764 A | 11/2000 | Yamakawa et al. | |
| 6,226,403 B1 | 5/2001 | Parthasarathy | |
| 6,332,143 B1 * | 12/2001 | Chase | 707/100 |

(Continued)

FOREIGN PATENT DOCUMENTS

CN         1302010 A         7/2001

(Continued)

OTHER PUBLICATIONS

Miller et al. "SPHINX: a framework for creating personal, site-specific Web crawlers". Computer Networks and ISDN Systems 30, 1998, p. 119-130.*

(Continued)

Primary Examiner — Jesse Pullias
(74) Attorney, Agent, or Firm — Yee & Associates, P.C.; Arthur J. Samadovitz

(57) ABSTRACT

A system for assisting a user who is learning a language to prioritize words to be learned in order of usage frequency is disclosed. A frequency determination program running on a computer determines the frequency of usage of each word at a list of locations provided by the user. Different algorithms to identify what constitutes a word are employed depending upon the language of the source data. The total number of words at each location and their usage frequency found during the user session, along with a total number of words and their usage frequency for all user sessions performed regardless of location, are calculated and made available to the user. The user can view usage frequencies for words from a single location, a group of locations, or all user sessions performed.

14 Claims, 5 Drawing Sheets

U.S. PATENT DOCUMENTS

| | | | |
|---|---|---|---|
| 6,411,952 | B1 | 6/2002 | Bharat et al. |
| 6,493,464 | B1 | 12/2002 | Hawkins et al. |
| 6,535,619 | B1 | 3/2003 | Suwa et al. |
| 6,539,376 | B1 | 3/2003 | Sundaresan et al. |
| 6,694,056 | B1 | 2/2004 | Ito et al. |
| 6,704,722 | B2 | 3/2004 | Baldonado |
| 6,795,579 | B2 | 9/2004 | Tang et al. |
| 6,912,308 | B2 | 6/2005 | Reintjes et al. |
| 7,013,046 | B2 | 3/2006 | Kawamura et al. |
| 7,298,904 | B2 | 11/2007 | Chen et al. |
| 7,346,492 | B2 * | 3/2008 | Shaw ............................... 704/9 |
| 7,385,595 | B2 | 6/2008 | Bryborn et al. |
| 7,490,033 | B2 | 2/2009 | Chen et al. |
| 7,756,337 | B2 | 7/2010 | Chen et al. |
| 7,814,121 | B2 | 10/2010 | Gilmour et al. |
| 2002/0067854 | A1 | 6/2002 | Reintjes et al. |
| 2002/0168107 | A1 | 11/2002 | Tang et al. |
| 2003/0099398 | A1 | 5/2003 | Izumi |
| 2003/0107558 | A1 | 6/2003 | Bryborn et al. |
| 2004/0030540 | A1 * | 2/2004 | Ovil et al. ......................... 704/1 |
| 2005/0004874 | A1 | 1/2005 | Gilmour et al. |
| 2005/0152600 | A1 | 7/2005 | Chen et al. |
| 2005/0152601 | A1 | 7/2005 | Chen et al. |
| 2005/0152602 | A1 | 7/2005 | Chen et al. |
| 2006/0155539 | A1 | 7/2006 | Chen et al. |
| 2009/0063478 | A1 | 3/2009 | Chen et al. |

FOREIGN PATENT DOCUMENTS

| | | |
|---|---|---|
| JP | 55138172 | 10/1980 |
| JP | 57121770 | 7/1982 |
| JP | 59144983 | 8/1984 |
| JP | 61-190684 | 8/1986 |
| JP | 02110796 | 4/1990 |
| JP | 06295356 | 10/1994 |
| JP | 07311817 | 11/1995 |
| JP | 08249424 | 9/1996 |
| JP | 10007930 A | 1/1998 |
| JP | 63208183 | 1/1998 |
| JP | 10-143610 | 5/1998 |
| JP | 10-171589 | 6/1998 |
| JP | 2001236466 | 8/2001 |
| JP | 2002259908 A | 9/2002 |

OTHER PUBLICATIONS

JP Office action dated Jul. 14, 2009.
JP Office action dated Jun. 26, 2007.
JP Office action dated Jul. 17, 2007.
USPTO Notice of Allowance for U.S. Appl. No. 10/756,919 dated Mar. 1, 2010.
USPTO office action for U.S. Appl. No. 10/756,919 dated Jan. 31, 2007.
Office Action, dated Jan. 31, 2007, regarding U.S. Appl. No. 10/756,918, 15 pages.
Office Action, dated May 8, 2007, regarding U.S. Appl. No. 10/756,918, 26 pages.
Final Office Action, dated Oct. 24, 2007, regarding U.S. Appl. No. 10/756,918, 32 pages.
Appeal Brief, dated Mar. 10, 2008, regarding U.S. Appl. No. 10/756,918, 26 pages.
Response to Non-Compliant Appeal Brief, dated Apr. 16, 2008, regarding U.S. Appl. No. 10/756,918, 30 pages.
Examiner's Answer, dated May 15, 2008, regarding U.S. Appl. No. 10/756,918, 36 pages.
Decision on Appeal, dated Feb. 1, 2010, regarding U.S. Appl. No. 10/756,918, 12 pages.
Final Office Action, dated Jun. 19, 2007, regarding U.S. Appl. No. 10/756,919, 23 pages.
Appeal Brief, dated Dec. 28, 2007, regarding U.S. Appl. No. 10/756,919, 34 pages.
Examiner's Answer, dated Mar. 7, 2008, regarding U.S. Appl. No. 10/756,919, 26 pages.
Examiner's Answer, dated Apr. 4, 2008, regarding U.S. Appl. No. 10/756,919, 27 pages.
Decision on Appeal, dated Nov. 4, 2009, regarding U.S. Appl. No. 10/756,919, 15 pages.
Office Action, dated Feb. 16, 2007, regarding U.S. Appl. No. 10/756,930, 24 pages.
Notice of Allowance, dated Jul. 13, 2007, regarding U.S. Appl. No. 10/756,930, 12 pages.
Office Action, dated Dec. 11, 2007, regarding U.S. Appl. No. 11/035,167, 20 pages.
Response to Office Action, dated Apr. 7, 2008, regarding U.S. Appl. No. 11/035,167, 8 pages.
Notice of Allowance, dated Aug. 11, 2008, regarding U.S. Appl. No. 11/035,167, 7 pages.
Office Action, dated Dec. 10, 2010, regarding U.S. Appl. No. 12/270,082, 21 pages.
Response to Office Action, dated Mar. 10, 2011, regarding U.S. Appl. No. 12/270,082, 15 pages.
Final Office Action, dated May 27, 2011, regarding U.S. Appl. No. 12/270,082, 17 pages.
Amendment Pursuant to Request for Continued Examination, dated Aug. 25, 2011, regarding U.S. Appl. No. 12/270,082, 17 pages.
Japanese Information Materials for IDS, dated Apr. 25, 2007, 1 page.

* cited by examiner

COMPILING WORD USAGE FREQUENCIES

This application is a continuation of application Ser. No. 11/035,167, filed Jan. 13, 2005, now U.S. Pat. No. 7,490,033 issued Feb. 10, 2009.

FIELD OF THE INVENTION

The present invention relates to a system for compiling word usage frequencies for use in connection with language studies. In particular, the system for compiling word usage frequencies determines usage frequency of each word in a list of resources to guide a language student regarding which words are the most important to learn.

BACKGROUND OF THE INVENTION

Systems for compiling word usage frequencies are desirable for prioritizing words to be learned by a language student. A tool that would enable a student or teacher to determine which words are the most used in a language would allow such words to be taught and learned before less important words. In order to determine which words are most used, a student or teacher may look to public information sources such as news services, and other written documents created in the language by native users of the language. In to determine the usage frequency from such documents, the student or teacher needs a method to determine usage frequency of each character and word.

Systems to support language study by determining word and character usage frequency must be able to analyze written words in languages that use an alphabet, known as Latin-based languages, and also in languages that use graphics, known as Sino-Tibetan language. As used herein, a "word" comprises one or more "characters" and a character comprises a letter of an alphabet either in a Latin based language or in a graphic in a Sino-Tibetan language. Words and characters may be encoded in Unicode, a universal coding scheme for storing the characters of the world's major languages.

The use of vocabulary builders is known in the prior art. For example, speech-recognition software, such as Dragon NaturallySpeaking® by ScanSoft® and ViaVoice™ by IBM®, include vocabulary building programs. One such vocabulary building program is a vocabulary optimizer program that refines a language model by scanning documents present in the folder labeled My Documents and/or e-mail on the user's computer. The language model at the time of installation includes default statistics regarding the probability that a given word will be used in the context of other words that precede it in a group of text. The vocabulary optimizer program adjusts the default statistics to reflect the contents of the user's documents.

Another known vocabulary building program is a vocabulary addition program that adds words from a user's documents to a vocabulary list allowing the user to select specific documents or the contents of entire folders from locations accessible by the user's computer. The user has the option of displaying a list of words from all the documents in a list that are not in the current vocabulary, along with the number of times they are used. The words are presented in alphabetical order or in order of decreasing usage frequency. The user can then select which words from the list will be added to a vocabulary file. The user is also informed of the total number of documents processed, the total number of words processed, and the number of words found that were not present in the program's dictionary.

The vocabulary optimizer program makes no provision for allowing the user to view the statistics regarding word usage frequency. The user cannot direct the vocabulary optimizer program to scan documents in any locations other than the My Documents folder. In addition, the vocabulary optimizer program does not scan documents that are older than 90 days or documents that are less than 512 bytes in size, and the user is not permitted to adjust these parameters.

The vocabulary addition program only reports the frequency of usage for words that are not already in the vocabulary addition program's dictionary or in an associated dictionary. The vocabulary addition program does not provide the user with usage frequency statistics for each individual document. It lacks the ability to calculate frequency of usage ratios or percentages. It does not allow the user to sort results by increasing frequency of usage. It does not track frequency of usage across multiple sessions of scanning.

The prior art vocabulary optimizer and the vocabulary addition program lack the ability to scan websites to collect frequency of usage data. Neither program allows the user to limit what resources are scanned based on the number of words they contain.

Therefore, a need exists for a system to determine usage frequency for each word in list of resources to guide a user regarding which words are the most important to learn.

SUMMARY OF THE INVENTION

The present invention that meets the needs identified above is a Compiler System (CS) for compiling word usage frequencies in any written language and encoding scheme. CS comprises a group of programs, a group of data files, and an interface. The programs include a Frequency Determination Program (FDP), an Analyze Graphic-based Data Program (AGP), an Analyze Alphabet-based Data Program (AAP), and a Calculate Results Program (CRP). The data files include a graphic dictionary, an alphabet dictionary, a list of punctuation marks and spaces, a list of locations, a character list, a location word list, and an overall word list. The interface gathers data that directs location or document to be analyzed, controls the overall search strategy, and determines how results are displayed.

The FDP instructs the processor to read the list of locations, determine whether each location is graphic based or alphabet based, execute the AGP for the locations that are graphic based, execute the AAP for the locations that are alphabet based, execute the CRP, display an output from the CRP, and combine the location word list with the overall word list to record the frequency of all words found by the FDP.

The AGP may populate the location word list with each unique word found at each of the graphic-based locations and a number of times the word is present by matching a string of characters to the graphic dictionary. The AAP may populate the location word list with each unique word found at each of the alphabet-based locations and a number of times the word is present by locating a string of characters located between characters listed in the list of punctuation marks and spaces. The CRP may calculate word usage frequencies as a ratio and a percentage for each location, or across all locations. The output from the CRP may be user-configurable to be displayed by individual location, a group of locations, or as a total of all locations.

BRIEF DESCRIPTION OF THE DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

The same reference numerals refer to the same parts throughout the various figures.

DESCRIPTION OF THE CURRENT EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention.

Figure 1:
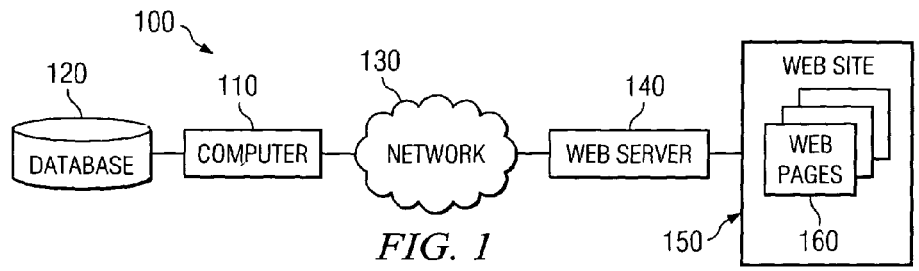
FIG. 1 is a schematic view of the current embodiment of the Compiler System.

FIG. 1 illustrates Compiler System 100 for determining word and character (when the character is a word) usage frequency. Compiler System 100 achieves this by running programs on computer 110 to scan resources accessible to computer 110. Resources can be stored in database 120, which most commonly is computer's 110 hard drive. Resources can include documents and e-mail. Additional resources can be accessed using network 130, including the Internet. Resources can also be website 150 having web pages 160 posted on web server 140.

Figure 2:
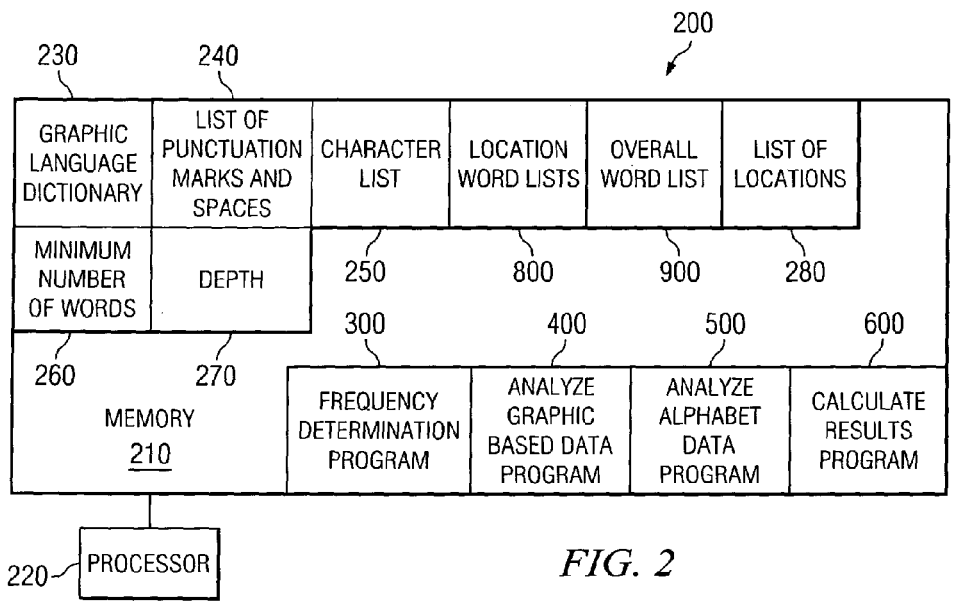
FIG. 2 is a schematic view of the computer configuration of the Compiler System.

FIG. 2 illustrates computer configuration 200 of computer 110. More particularly, computer configuration 200 shows processor 220 and memory 210 of computer 110. Memory 210 stores graphic dictionary 230, list of punctuation marks and spaces 240, character list 250, location word lists 800, overall word list 900, list of locations 280, minimum number of words 260, and depth 270. Frequency determination program (FDP) 300, analyze graphic-based data program (AGP) 400, analyze alphabet-based data program (AAP) 500, and calculate results program (CRP) 600 are loaded into memory 210 and provide instructions to processor 220. FDP 300 determines word and character usage frequency by employing subroutines in the form of AGP 400, AAP 500, and CRP 600.

Figure 3:
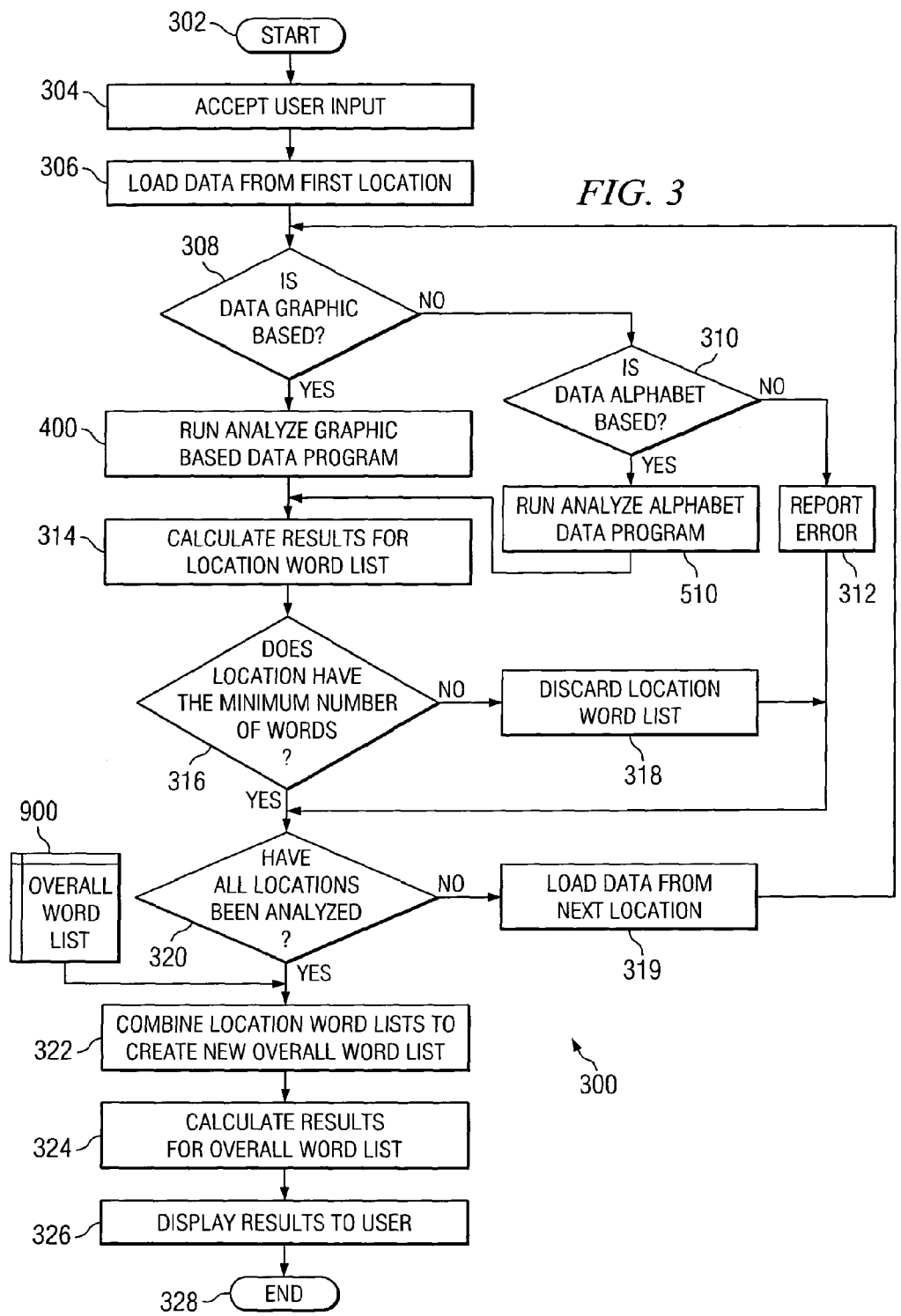
FIG. 3 is a flow diagram view of the Frequency Determination Program (FDP) of the present invention.

FIG. 3 illustrates FDP 300. FDP 300 begins (302) by receiving input provided by user interface 700 (see FIG. 7). After loading data from a first location 702 in list of locations 280 (306), FDP 300 determines if the data is graphic based (380). This can be accomplished easily if the data is encoded in Unicode. If the data is not encoded in Unicode, a translator program can be employed to convert the data from its native format to Unicode. If the data is graphic based, then FDP 300 runs AGP 400. If the data is not graphic based, FDP 300 determines if the data is alphabet based (310). If it is, then FDP 300 runs AAP 500. If the data is not alphabet based, then FDP 300 reports an error (312) and proceeds to step 318.

Once AGP 400 or AAP 500 has executed, FDP 300 passes location word list 800 to CRP 600 to calculate the results for the location 702 (314). FDP 300 then determines if the location 702 has a number of words greater than or equal to the quantity stored in depth 270 (316). If the location 702 lacks sufficient words 716, location word list 800 is discarded (318). If there is a sufficient number of words 716, or after the completion of steps 312 or 318, FDP 300 determines if all locations have been analyzed (320). If all locations have not been analyzed, FDP 300 loads data from the next location 702 in list of locations 280 (319) and returns to step 308.

After all locations have been analyzed, FDP 300 combines location word lists 800 with overall word lists 900 to create a new overall word lists 900 (322). FDP 300 then passes overall word list 900 to CRP 600 to calculate the results for overall word lists 900 (324). After the results are calculated, FDP 300 displays results using user interface 700 (326) and then terminates (328).

Figure 4:
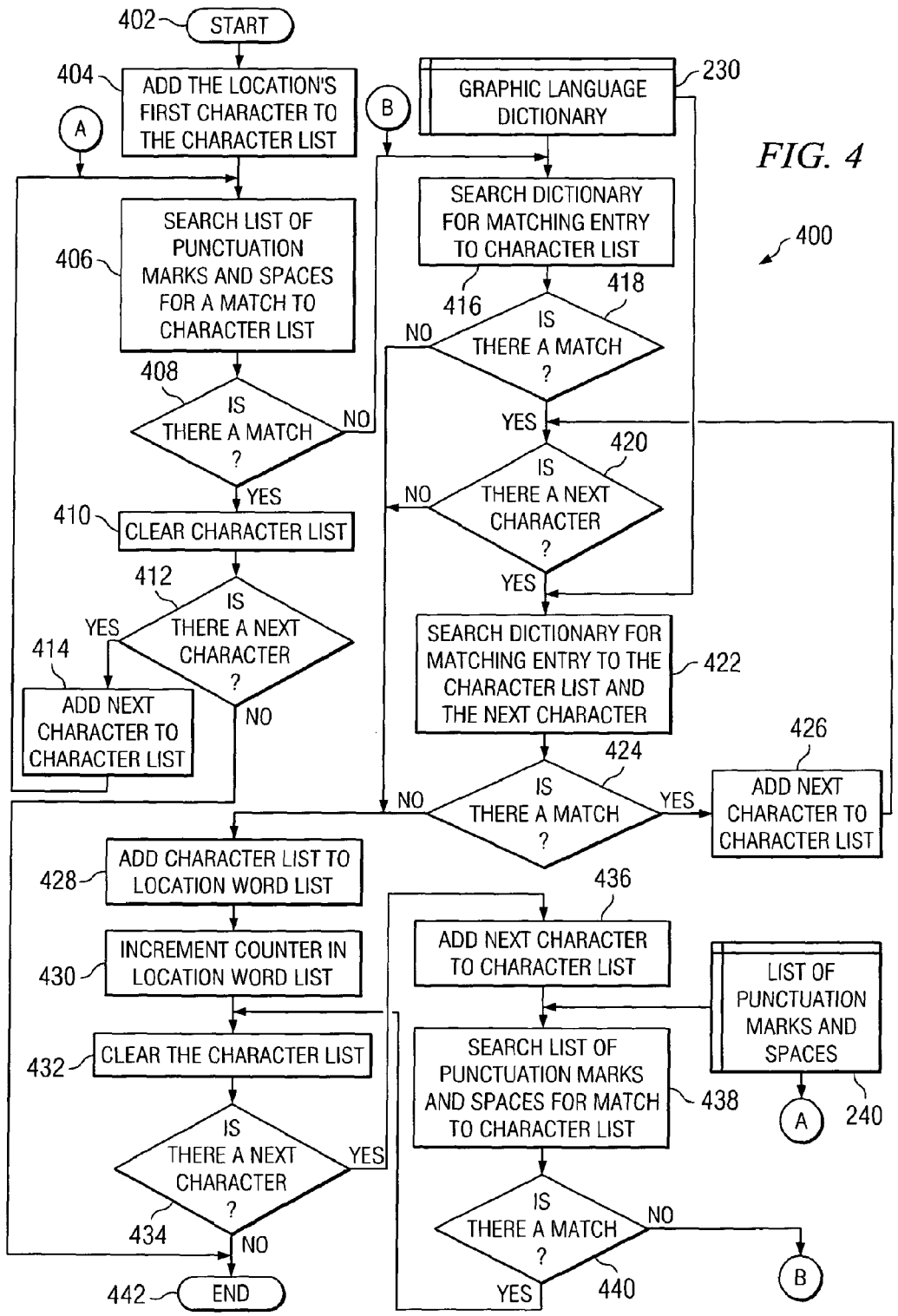
FIG. 4 is a flow diagram view of the Analyze Graphic-based Data Program (AGP) of the present invention.

FIG. 4 illustrates AGP 400. More particularly, AGP 400 analyzes graphic languages. AGP 400 begins (402) by adding locations 702 to character list 250. AGP 400 uses list of punctuation marks and spaces 240 to search for a match to character list 250 (406). List of punctuation marks and spaces 240 includes punctuation marks and spaces from all written languages, along with end of line, end of paragraph, and end of file codes. If a match is found (408), character list 250 is cleared (410), and AGP 400 determines if there is a next character (412). If there is a next character, it is added to character list 250 (414), and AGP 400 returns to step 406. If there is not a next character, then AGP 400 terminates (442). Steps 406-414 ensure that any leading punctuation marks are not analyzed as being potential words 716.

If a match is not found in step 408, graphic dictionary 230 is searched for an entry that begins with character list 250 (416). If a match is found in step 418, AGP 400 determines if there is a next character (420). If there is a next character, then graphic dictionary 230 is searched for an entry that begins with the character in character list 250 and the next character (422). If a match is found in step 424, then the next character is added to character list 250 (426), and AGP 400 returns to step 420.

Graphic dictionary 230 enables AGP 400 to determine the end of a word since a word may consist on one graphic character or a plurality of graphic characters. In an alternate embodiment, AGP 400 may operate without the dictionary and provide a count of all frequencies. Such an embodiment would be a configurable option, at the user's discretion for the purpose of reducing processing time.

Persons skilled in the art will be aware that the graphic dictionary needs to have the same encoding scheme as the data in the search file, but that if the encoding schemes are different, CS 100 may call up a routine to convert the data in the search file to the same encoding scheme as the dictionary. Alternatively, CS 100 may have multiple dictionaries in multiple encoding schemes. In the preferred embodiment, graphic dictionary 230 is Unicode.

If a match is not found in steps 418 or 424, or if a next character is not found in step 420, then character list 250 is added to location word list 800 for the location 702 (428) as word 716. Counter 802 associated with word 716 is incremented by one (430), and character list 250 is cleared (432). AGP 400 then determines if there is a next character (434). If there is not, then AGP 400 terminates (442).

If there is a next character, then it is added to character list 250 (436). List of punctuation marks and spaces 240 is then searched for a match to character list 250 (438). If step 440 determines there is a match, then AGP 400 returns to step 432. Steps 438 and 440 ensure that any leading punctuation marks are not analyzed as being potential words 716. Once step 440 determines there is not a match, AGP 400 returns to step 416.

In summation, after ensuring that the first character is not a punctuation mark, AGP 400 identifies one or more characters from location 702 and attempts to find the character(s) in graphic dictionary 230. If a character string is present in the dictionary, then the present invention proceeds to the counting component (steps 428 and 430) with word 716. If there is no match in graphic dictionary 230, then the first character passes to the counting component. After passing a character or word 716 to the counting component, AGP 400 proceeds to the next character at location 702 that was not part of the previous word 716 or character after ensuring it is not a punctuation mark.

Figure 5:
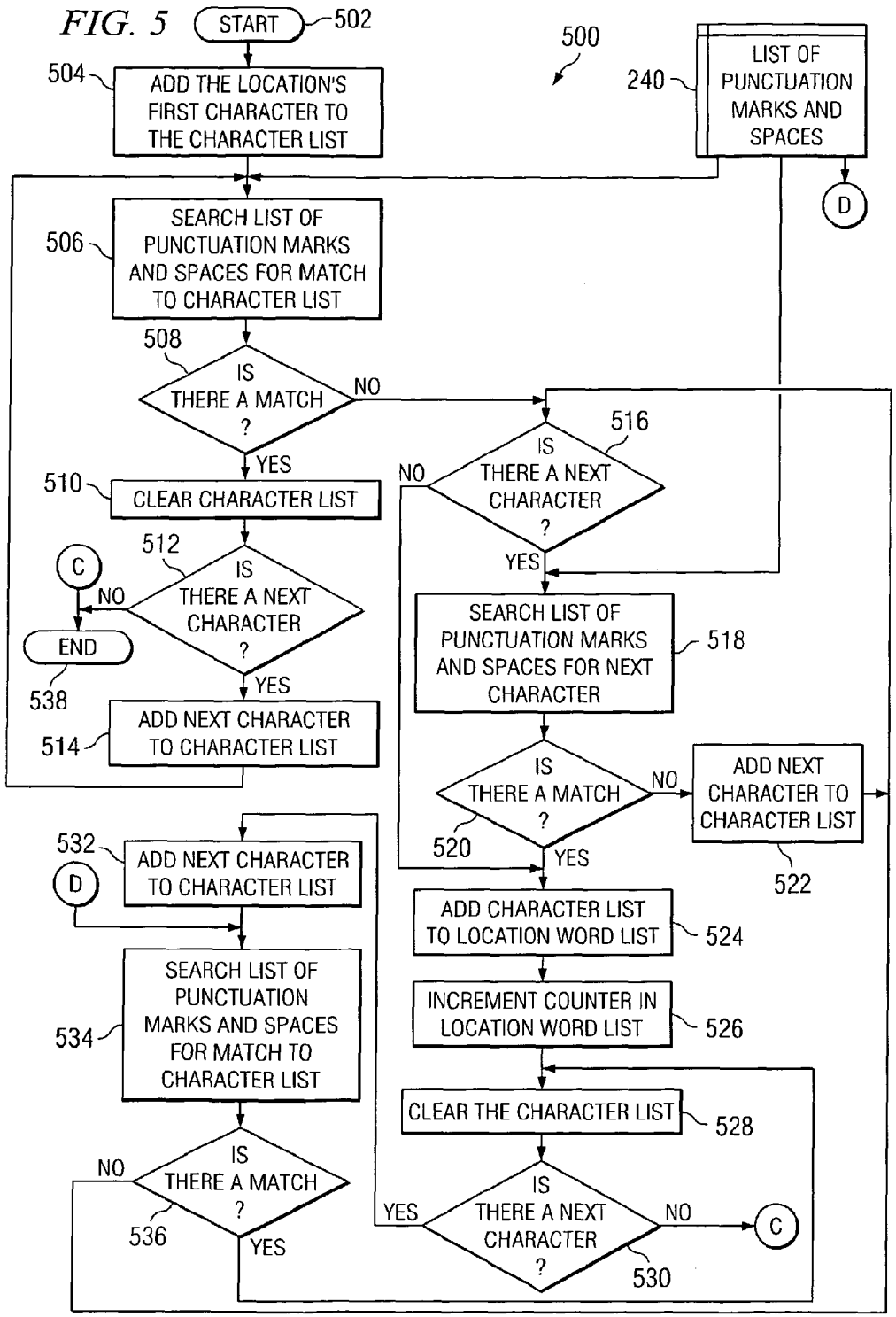
FIG. 5 is a flow diagram view of the Analyze Alphabet-based Data Program (AAP) of the present invention.

FIG. 5 illustrates Analyze Alphabet-based Data Program (AAP) 500. AAP 500 analyzes alphabet-based languages. AAP 500 begins (502) by adding locations 702 to character list 250. AAP 500 uses list of punctuation marks and spaces 240 to search for a match to character list 250 (506). If a match is found (508), character list 250 is cleared (510), and AAP 500 determines if there is a next character (512). If there is a next character, it is added to character list 250 (514), and AAP 500 returns to step 506. If there is not a next character, then AAP 500 terminates (538). Steps 506-514 ensure that any leading punctuation marks are not analyzed as being potential words 716.

If a match is not found in step 508, AAP 500 determines if there is a next character (516). If there is, list of punctuation marks and spaces 240 is then searched for a match to the next character (518). If a match is not found in step 520, the next character is added to the character list 250 (522), and AAP 500 returns to step 516.

If a match is found in step 520, or if there is not a next character in step 516, then character list 250 is added to location word list 800 for location 702 (524) as word 716. Counter 802 associated with word 716 is incremented by one (526), and character list 250 is cleared (528). AAP 500 then determines if there is a next character (530). If there is not, then AAP 500 terminates (538).

If there is a next character, then it is added to character list 250 (532). List of punctuation marks and spaces 240 is then searched for a match to character list 250 (534). If step 536 determines there is a match, then analyze AAP 500 returns to step 528. Steps 534 and 536 ensure that any leading punctuation marks are not analyzed as being potential words 716.

Once step 536 determines there is not a match, AAP 500 returns to step 516.

In summation, AAP 500 pulls in one or more characters from location 702 until it encounters a space or punctuation character after ensuring that the first character is not a punctuation mark. This constitutes word 716, and the process proceeds to the counting component (steps 524 and 526). AAP 500 then proceeds to the next character at location 702 that was not part of the previous word 716 after ensuring it is not a punctuation mark.

Figure 6:
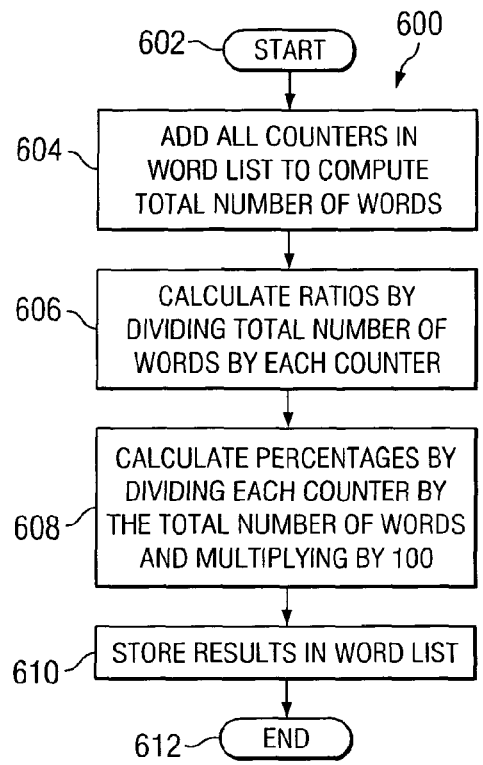
FIG. 6 is a flow diagram view of the calculate results program (CRP) of the present invention.

FIG. 6 illustrates Calculate Results Program (CRP) 600. CRP 600 receives location word list 800 or overall word list 900 from FDP 300 and begins (602) by adding all of counters 802 to calculate total number of words 714 found (604). CRP 600 divides total number of words 714 by the value of each counter 802 to calculate ratios 804 (606). CRP 600 then calculates percentages 806 by dividing the value of each counter 802 by total number of words 714 and multiplying the result by 100 (608). The results are stored in either location word list 800 or overall word list 900, depending upon which was received from frequency determination program 300. CRP 600 then terminates (612).

In summation, CRP 600 performs several functions. First, it calculates total number of words 716 found. Second, it determines the usage frequency of each word 716. CRP 600 may express the usage frequency as ratio 804 or percentage 806. For example, a word 716 that occurs 50 times in 10,000 words has a usage ratio of 1:200 and occurs 0.5% of the time.

Figure 7:
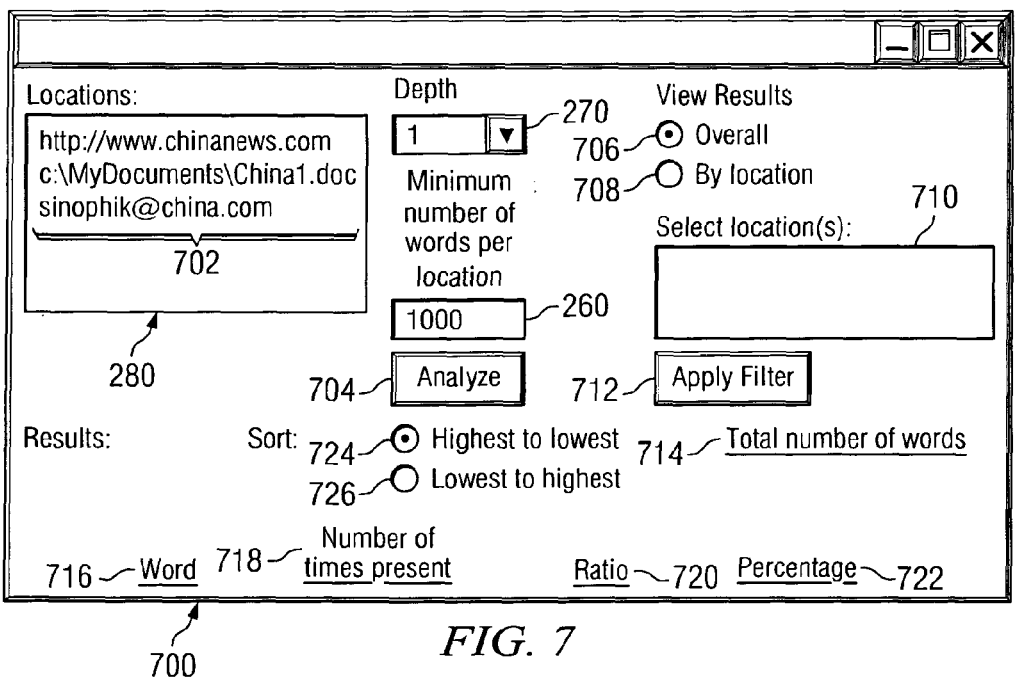
FIG. 7 is a schematic view of the interface of the Compiler System (CS)

FIG. 7 illustrates user interface 700 of the present invention. More particularly, user interface 700 gathers data that directs frequency determination program 300 to locations 702 to be analyzed, controls the overall search strategy, and determines how results are displayed. The user provides one or more locations 702 to form a list of locations 280. Locations 702 can be website 150 addresses, local and/or remote file locations, e-mail accounts, or any other source containing text. Depth 270 allows the user to specify how deeply into the website 150 the search is to take place. The frequency determination program 300 will stop when it has either traced all of the website's 150 hyperlinks to the depth 270 specified or has fully searched the entire website 150 without reaching the specified depth 270.

Besides the basic searching capabilities described above, the user may also specify that a minimum number of words 260 must be present before searching a particular website 150. This is accomplished by entering a value into minimum number of words 260. This ensures that the user gets a good statistical sample.

After clicking the analyze button 726 to initiate frequency determination program 300, frequency determination program 300 returns a list of words 716 found ranked by frequency of usage, supplies the number of times it found a given word or character via counter 718, and reports each word's 716 usage ratio 720 and percentage 722. Frequency determination program 300 also provides total number of words 714 found.

The user has the option of viewing a number of usage frequencies. To view usage frequency based on a cumulative total of all the searches ever performed, the user selects overall 706. Overall word list 900 maintains a total count for each word 716 or character in counter 802, which can be used to calculate total number of all words 714 found. Alternatively, the user can find usage frequencies for a single file or web page 160, particular websites 150, or for a class of websites 150 by selecting by location 708 and one or more locations 702 in a list 710. Apply filter 712 determines how results are presented to the user. The user also has the option of sorting the results from highest to lowest frequency 724 or from lowest to highest frequency 726.

Figure 8:
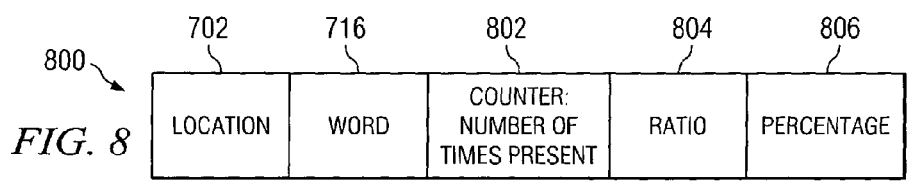
FIG. 8 is a schematic view of the location word list of the present invention.

FIG. 8 illustrates location word list 800 of the present invention. More particularly, location word list 800 stores each word 716 found during a single user session. Location word list 800 also stores counter 802, ratio 804, and percentage 806 associated with each word 716 by location 702. Location word list 800 allows the user to view results for a particular location 702 or for a group of locations 702.

Figure 9:
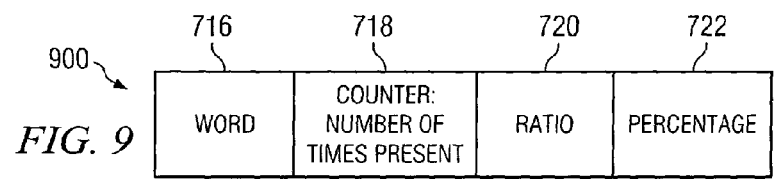
FIG. 9 is a schematic view of the overall word list of the present invention.

FIG. 9 illustrates overall word list 900 of the present invention. More particularly, overall word list 900 stores each word 716 and counter 718, ratio 720, and percentage 722 associated with each word 716 that frequency determination program 300 has ever found. Overall word list 900 persists after a given user session to maintain a cumulative record of the results of all user sessions.

CS 100 includes a method for compiling word usage frequencies comprising the steps of obtaining a list of locations having words to be counted, counting a number of times each of the words is present at each of the locations in the list, calculating a total number of words present at each of the locations in the list, and displaying the total number of times a word is present at each of the locations in the list and the total number of words present at each of the locations in the list. The method may further comprises the steps of calculating a location word frequency ratio by dividing the total number of words present at each of the locations in the list by the number of times each word is present at each of the locations in the list and displaying the location word frequency ratio for each of the words present at each of the locations in the list. The method may further comprise the steps of calculating a location word frequency percentage by dividing the number of times each word is present at each of the locations in the list by the total number of words present at each of the locations in the list, multiplying by 100, and displaying the location word frequency percentage for each of the words present at each of the locations in the list.

The method further comprise the steps of calculating an overall word frequency ratio by adding the total number of words present at all of the locations in the list, adding the total number of times each word is present at any of the locations in the list, dividing the total number of words present at all of the locations in the list by the total number of times each word is present at any of the locations in the list, and displaying the overall word frequency ratio for each of the words present at any of the locations in the list. The method may further comprise the steps of calculating an overall word frequency percentage by adding the total number of words present at all of the locations in the list, adding the total number of times each word is present at any of the locations in the list, dividing the total number of times each word is present at any of the locations in the list by the total number of words present at all of the locations in the list, multiplying by 100, and displaying the overall word frequency percentage for each of the words present at any of the locations in the list.

The depth to which the method traverses the hyperlinks to count the number of times each of the words is present at the websites may be user configurable. The total number of words present at a location in the list may have to equal or exceed a user-configurable quantity for the step of displaying a total number of times a word is present at each of the locations in the list and a total number of words present at each of the locations in the list to be performed for that location. Prior to performing the step of calculating a total number of words present at each of the locations in the list, the method may determine if the words at the locations are graphic based or alphabet based.

The step of calculating a total number of words present at each of the locations in the list may comprise the steps of (a) adding a first character to a character list; (b) searching a list of punctuation marks and spaces for a match to the character list; (c) responsive to finding a match in step (b), clearing the character list; (d) responsive to finding a match in step (b), determining if there is a next character; (e) responsive to finding a next character in step (d), adding the next character to the character list; (f) responsive to finding a next character in step (d), repeating steps (b)-(f); (g) responsive to determining the words at the location are graphic based and responsive to not finding a match in step (b), searching a graphic dictionary for a match to the character list; (h) responsive to determining the words at the location are graphic based and responsive to finding a match in steps (g) or (i), determining if there is a next character; (i) responsive to determining the words at the location are graphic based and responsive to finding a next character in step (h), searching the graphic dictionary for a match to the character list and the next character; k) responsive to determining the words at the location are graphic based and responsive to finding a match in step (i), adding the next character to the character list; (k) responsive to determining the words at the location are graphic based and responsive to finding a next character is present in step (h), repeating steps (h)-(k); (l) responsive to determining the words at the locations are graphic based and responsive to not finding a match in steps (g) or (i) or a next character in step (h), adding the character list to a location word list; (m) responsive to determining the words at the location are alphabet based, determining if there is a next character; (n) responsive to determining the words at the location are alphabet based and responsive to finding a next character in step (m), searching the list of punctuation marks and spaces for the next character; (o) responsive to determining the words at the locations are alphabet based and responsive to not finding a match in step (n), repeating steps (m)-(o); (p) responsive to determining the words at the location are alphabet based and responsive to not finding a next character in step (m) or finding a match in step (n), adding the character list to the location word list; (q) incrementing a counter in the location word list; (r) clearing the character list; (s) determining if there is a next character; (t) responsive to finding a next character in step (s), adding the next character to the character list; (u) responsive to finding a next character in step (s), searching the list of punctuation marks and spaces for a match to the character list; (v) responsive to finding a match in step (u), repeating steps (r)-(v); (w) responsive to determining the words at the location are graphic based and responsive to not finding a match in step (u), repeating steps (g)-(w); (x) responsive to determining the words at the location are alphabet based and responsive to not finding a match in step (u), repeating steps (m)-(x); and (y) adding the counters associated with the location word list together to calculate the total number of times a word is present at each of the locations in the list.

The method of CS 100 is operable in an apparatus comprising a processor, memory, and a network connection to a web server hosting a web site. There are, of course, additional features of the invention that will be described hereinafter and which will form the subject matter of the claims attached.

Persons skilled in the art understood that there are a number of ways to use CS 100. CS 100 may use its search results itself. Particularly for Sino-Tibetan languages with a large number of graphic characters, of which only a small percentage are used in day to day communication, CS 100 can build its own dictionary of the most commonly used characters. CS 100 can then search this dictionary to find a word before searching the full dictionary.

CS 100 may also function as a callable module to another program. The program calling the present invention may direct a search and utilize the results, or it may simply call the present invention with a word and obtain a usage frequency from a search done previously. Other programs may use the present invention to rank the words in the program's dictionary and determine the order in which to teach words to the student.

CS 100 may function in a standalone fashion by interacting with a user, obtaining its search instructions from the user, and providing the results directly to the user. When the user is directing a search at a particular source, the usage frequency data is determined for that source. A ranking of the most often used words in that source will motivate the user to learn those words. Using the various usage frequencies, the present invention can provide rankings for a single source, a class of sources in general, or for general language use.

In addition, for graphic languages, CS 100 can break down words into individual characters and extract the definitions for each character from the dictionary. It can then present this information to the user for educational purposes.

With respect to the above description of CS 100, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Although determining usage frequency of each word in a list of resources to guide a user regarding which words are the most important to learn has been described, it should be appreciated that the system for compiling word usage frequencies herein described is also suitable for creating vocabularies for speech-recognition systems. A wide variety of word identification algorithms may be used instead of AGP 400 and AAP 500 described above.

Furthermore, the CS 100 may be integrated with other programs. Such integration with other program may allow input from those programs, and alternatively, may allow usage frequency to be provided to the integrated programs. For example, handwriting recognition software may provide input for processing by the present invention, and educational software may use frequency data from the invention to determine which words to teach first. Besides searching files and determining usage frequency, the present invention may simply return a usage frequency value to a calling program when supplied with a particular word or character.

Therefore, the foregoing is considered as illustrative only of the principles of the Compiler System. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A computer system for compiling word usage frequencies comprising:
   one or more processors, one or more computer-readable memories and one or more computer-readable, tangible storage devices;
   program instructions, stored on at least one of the one or more computer-readable, tangible storage devices for execution by at least one of the one or more processors via at least one of the one or more memories, to perform a search of one or more locations identified in an interface for one or more alphabet based words in a Latin based language or one or more graphic based words in a Sino-Tibetan language, wherein the program instructions to perform the search trace to a depth of one or more hyperlinks in the one or more locations linking one or more linked locations, and wherein the program instructions to perform the search further search the one or more linked locations;
   program instructions, stored on at least one of the one or more computer-readable, tangible storage devices for execution by at least one of the one or more processors via at least one of the one or more memories, to determine a first number, the first number equaling a number of times at least one graphic based word that matches an entry in a graphic dictionary is present at the one or more locations and the one or more linked locations;
   program instructions, stored on at least one of the one or more computer-readable, tangible storage devices for execution by at least one of the one or more processors via at least one of the one or more memories, to determine a second number, the second number equaling a number of times an alphabet-based word is present at the one or more locations and the one or more linked locations; and
   program instructions, stored on at least one of the one or more computer-readable, tangible storage devices for execution by at least one of the one or more processors via at least one of the one or more memories, to receive, via the interface, the one or more locations, the depth, and a designation of a minimum number of words in each of the one or more locations and in each of the one or more linked locations.

2. The computer system of claim 1, wherein the graphic dictionary is in a Unicode format, and wherein the computer system further comprises program instructions, stored on at least one of the one or more computer-readable, tangible storage devices for execution by at least one of the one or more processors via at least one of the one or more memories, to convert data from a graphic format to the Unicode format.

3. The computer system of claim 1, further comprising:
   program instructions, stored on at least one of the one or more computer-readable, tangible storage devices for execution by at least one of the one or more processors via at least one of the one or more memories, to display on the interface a ratio, a percentage, and one of the first number and the second number.

4. The computer system of claim 1, further comprising:
   program instructions, stored on at least one of the one or more computer-readable, tangible storage devices for execution by at least one of the one or more processors via at least one of the one or more memories, to access a word list;
   program instructions, stored on at least one of the one or more computer-readable, tangible storage devices for execution by at least one of the one or more processors via at least one of the one or more memories, to calculate a total number of words in the word list;
   program instructions, stored on at least one of the one or more computer-readable, tangible storage devices for execution by at least one of the one or more processors via at least one of the one or more memories, to calculate, for each word in the word list, a usage frequency;
   program instructions, stored on at least one of the one or more computer-readable, tangible storage devices for execution by at least one of the one or more processors via at least one of the one or more memories, to store, in the word list, the total number of words in the word list and the usage frequency for each word in the word list; and program instructions, stored on at least one of the one or more computer-readable, tangible storage devices for execution by at least one of the one or more processors via at least one of the one or more memories, to display a cumulative word usage frequency in a single location, in a group of locations, or across a plurality of user sessions.

5. A computer program product for compiling word usage frequencies, the computer program product comprising:

one or more computer-readable, tangible storage devices;

program instructions, stored on at least one of the one or more computer-readable, tangible storage devices, to perform a search of one or more locations identified in an interface for one or more alphabet based words in a Latin based language or one or more graphic based words in a Sino-Tibetan language, wherein the program instructions to perform the search trace to a depth of one or more hyperlinks in the one or more locations linking one or more linked locations, and wherein the program instructions to perform the search further search the one or more linked locations;

program instructions, stored on at least one of the one or more computer-readable, tangible storage devices, to determine a first number, the first number equaling a number of times at least one graphic based word that matches an entry in a graphic dictionary is present at the one or more locations and the one or more linked locations;

program instructions, stored on at least one of the one or more computer-readable, tangible storage devices, to determine a second number, the second number equaling a number of times an alphabet-based word is present at the one or more locations and the one or more linked locations; and program instructions, stored on at least one of the one or more computer-readable, tangible storage devices, to receive, via the interface, the one or more locations, the depth, and a designation of a minimum number of words in each of the one or more locations and in each of the one or more linked locations.

6. The computer program product of claim 5, wherein the graphic dictionary is in a Unicode format, and wherein the computer program product further comprises program instructions, stored on at least one of the one or more computer-readable, tangible storage devices, to convert data from a graphic format to the Unicode format.

7. The computer program product of claim 5 further comprising:

program instructions, stored on at least one of the one or more computer-readable, tangible storage devices, to access a word list;

program instructions, stored on at least one of the one or more computer-readable, tangible storage devices, to calculate a total number of words in the word list;

program instructions, stored on at least one of the one or more computer-readable, tangible storage devices, to calculate, for each word in the word list, a usage frequency;

program instructions, stored on at least one of the one or more computer-readable, tangible storage devices, to store, in the word list, the total number of words in the word list and the usage frequency for each word in the word list; and program instructions, stored on at least one of the one or more computer-readable, tangible storage devices, to display a cumulative word usage frequency in a single location, in a group of locations, or across a plurality of user sessions.

8. The computer program product of claim 5, further comprising:

program instructions, stored on at least one of the one or more computer-readable, tangible storage devices, to display on the interface a ratio, a percentage, and one of the first number and the second number.

9. A method for compiling word usage frequencies comprising:

a computer performing a search of one or more locations identified in an interface for one or more alphabet based words in a Latin based language or one or more graphic based words in a Sino-Tibetan language, wherein the computer performing the search comprises the computer tracing to a depth of one or more hyperlinks in the one or more locations linking one or more linked locations, and wherein the computer performing the search further comprises the computer further searching the one or more linked locations;

the computer determining a first number, the first number equaling a number of times at least one graphic based word that matches an entry in a graphic dictionary is present at the one or more locations and the one or more linked locations; and the computer determining a second number, the second number equaling a number of times an alphabet-based word is present at the one or more locations and the one or more linked locations and the computer receiving, via the interface, the one or more locations, the depth, and a designation of a minimum number of words in each of the one or more locations and in each of the one or more linked locations.

10. The method of claim 9 further comprising:

the computer storing a total number words present at each of the one or more locations and the one or more linked locations, and a cumulative usage frequency for one or more words found in one or more searches; and the computer, responsive to a request, directing a display device to display a total number of times the one or more words appears at each of the one or more locations and the one or more linked locations, the total number of words present at each of the one or more locations and the one or more linked locations, the cumulative usage frequency, and a percentage associated with each of the one or more words.

11. The method of claim 10 further comprising:

the computer calculating one or more word frequency ratios for each of the one or more words by dividing a first total number of times each of the one or more words is present at each of the one or more locations and each of the one or more linked locations by a second total number of words present at each of the one or more locations and each of the one or more linked locations; and the computer directing the display device to display one or more word frequency ratios for each of the one or more words.

12. The method of claim 9, further comprising:

the computer displaying on the interface a ratio, a percentage, and one of the first number and the second number.

13. A computer system comprising one or more processors, one or more computer-readable memories, one or more computer-readable, tangible storage devices and program instructions which are stored on the one or more computer-readable, tangible storage devices for execution by the one or more processors via the one or computer-readable memories and when executed by the one or more processors perform the method of claim 9.

14. A computer program product comprising one or more computer-readable, tangible storage devices and computer-readable program instructions which are stored on the one or more storage devices and when executed by one or more processors, perform the method of claim 9.

* * * * *